(12) United States Patent
Farre Guiu et al.

(10) Patent No.: US 12,374,112 B2
(45) Date of Patent: *Jul. 29, 2025

(54) FAST VIDEO CONTENT MATCHING

(71) Applicant: Disney Enterprises, Inc., Burbank, CA (US)

(72) Inventors: Miquel Angel Farre Guiu, Bern (CH); Pablo Pernias, Sant Joan d'Alacant (ES); Albert Aparicio Isarn, Barcelona (ES); Marc Junyent Martin, Barcelona (ES)

(73) Assignee: Disney Enterprises, Inc., Burbank, CA (US)

( * ) Notice: Subject to any disclaimer, the term of this patent is extended or adjusted under 35 U.S.C. 154(b) by 294 days.

This patent is subject to a terminal disclaimer.

(21) Appl. No.: 17/894,558

(22) Filed: Aug. 24, 2022

(65) Prior Publication Data

US 2022/0406063 A1 Dec. 22, 2022

Related U.S. Application Data

(63) Continuation of application No. 16/942,483, filed on Jul. 29, 2020, now Pat. No. 11,482,004.

(51) Int. Cl.
*G06V 20/40* (2022.01)
*G06F 18/22* (2023.01)
(Continued)

(52) U.S. Cl.
CPC .............. *G06V 20/48* (2022.01); *G06F 18/22* (2023.01); *G06V 30/10* (2022.01); *G06V 40/167* (2022.01)

(58) Field of Classification Search
None
See application file for complete search history.

(56) References Cited

U.S. PATENT DOCUMENTS 4,734,770 A * 3/1988 Matsuba ............... G06T 1/20
708/801
8,810,728 B2 * 8/2014 Black ............... H04N 21/439
348/515

(Continued)

FOREIGN PATENT DOCUMENTS

EP         3264326 A1 * 1/2018   ....... G06F 16/24568
WO   WO-2010089383 A2 * 8/2010   .............. F28F 13/16

*Primary Examiner* — Soo Shin
(74) *Attorney, Agent, or Firm* — Farjami & Farjami LLP

(57) ABSTRACT

A video content matching system includes a computing platform having a hardware processor and a memory storing a software code. When executed, the software code obtains a reference digital profile of a reference video segment, obtains a target digital profile of target video content, and compares the reference and target digital profiles to detect a candidate video segment of the target video content for matching to the reference video segment. The software code also frame aligns reference video frames of the reference video segment with corresponding candidate video frames of the candidate video segment to provide frame aligned video frame pairs, pixel aligns the frame aligned video frame pairs to produce frame and pixel aligned video frame pairs, and identifies, using the frame and pixel aligned video frame pairs, the candidate video segment as a matching video segment or a non-matching video segment for the reference video segment.

20 Claims, 9 Drawing Sheets

(51) Int. Cl.
  *G06V 30/10*     (2022.01)
  *G06V 40/16*     (2022.01)

(56) References Cited

U.S. PATENT DOCUMENTS

| | | | | |
|---|---|---|---|---|
| 9,584,844 | B2* | 2/2017 | Onno | H04N 21/44016 |
| 9,877,066 | B2* | 1/2018 | Duong | H04N 21/242 |
| 11,163,818 | B2* | 11/2021 | Pereira | G06F 16/41 |
| 11,252,329 | B1* | 2/2022 | Cier | H04N 23/53 |
| 11,482,004 | B2* | 10/2022 | Farre Guiu | G06F 18/22 |
| 2003/0225513 | A1* | 12/2003 | Gagvani | G06T 15/04 |
| | | | | 340/995.14 |
| 2010/0007665 | A1* | 1/2010 | Smith | G06T 13/40 |
| | | | | 345/473 |
| 2010/0309377 | A1* | 12/2010 | Schoenblum | H04N 19/587 |
| | | | | 348/607 |
| 2014/0169471 | A1* | 6/2014 | He | H04N 19/61 |
| | | | | 375/240.16 |
| 2017/0019716 | A1* | 1/2017 | Neumeier | G06V 10/40 |
| 2017/0132472 | A1* | 5/2017 | Tao | G06N 3/04 |
| 2018/0357472 | A1* | 12/2018 | Dreessen | G06V 20/49 |
| 2019/0073520 | A1* | 3/2019 | Ayyar | G06V 40/173 |
| 2019/0230387 | A1* | 7/2019 | Gersten | G06F 16/783 |
| 2019/0251113 | A1* | 8/2019 | Pereira | G06F 16/783 |
| 2019/0251114 | A1* | 8/2019 | Pereira | G06F 16/7847 |
| 2020/0322690 | A1* | 10/2020 | Neumeier | H04N 21/845 |
| 2022/0012362 | A1* | 1/2022 | Kuta | G06V 10/758 |
| 2022/0044023 | A1* | 2/2022 | Xue | G06V 20/64 |
| 2022/0406063 | A1* | 12/2022 | Farre Guiu | G06V 20/48 |
| 2024/0259613 | A1* | 8/2024 | Hoarty | G06F 16/783 |

* cited by examiner

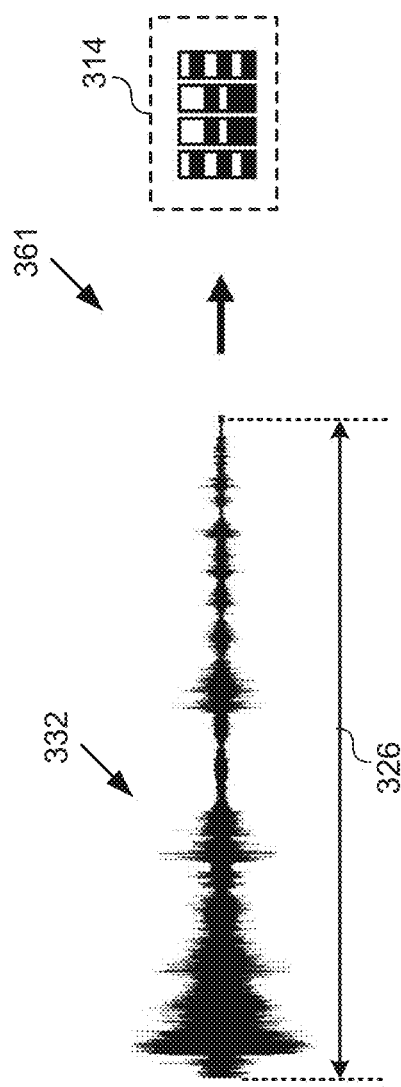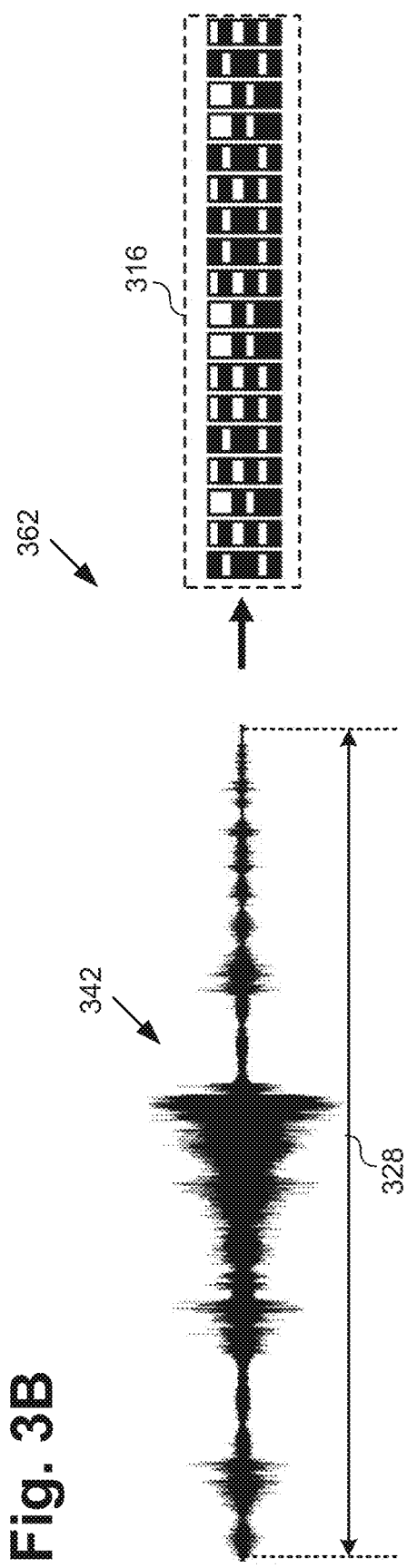

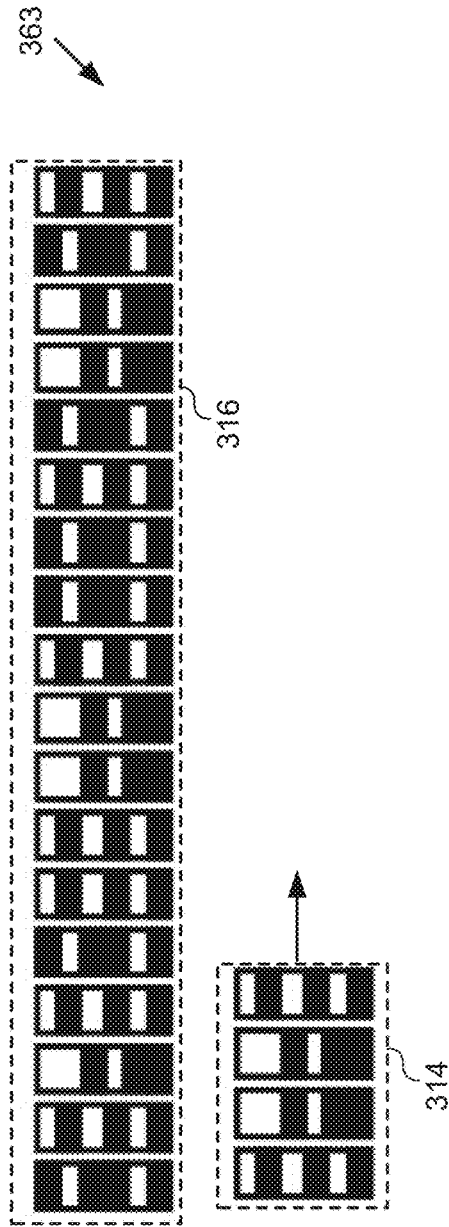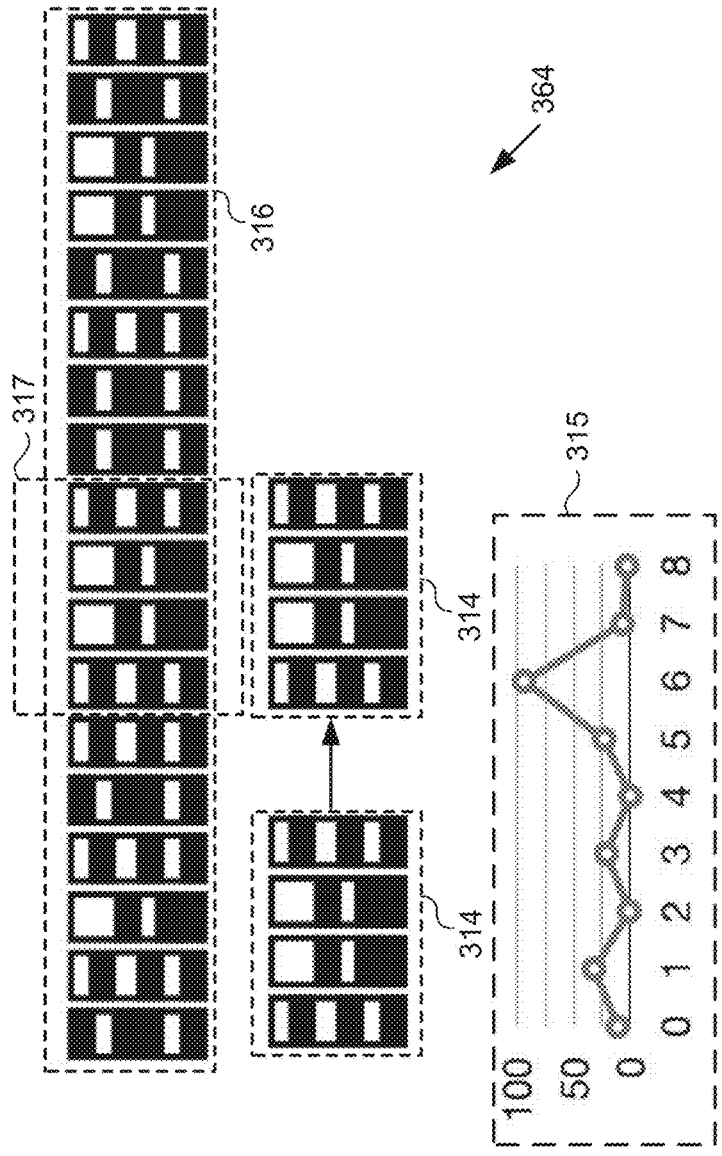

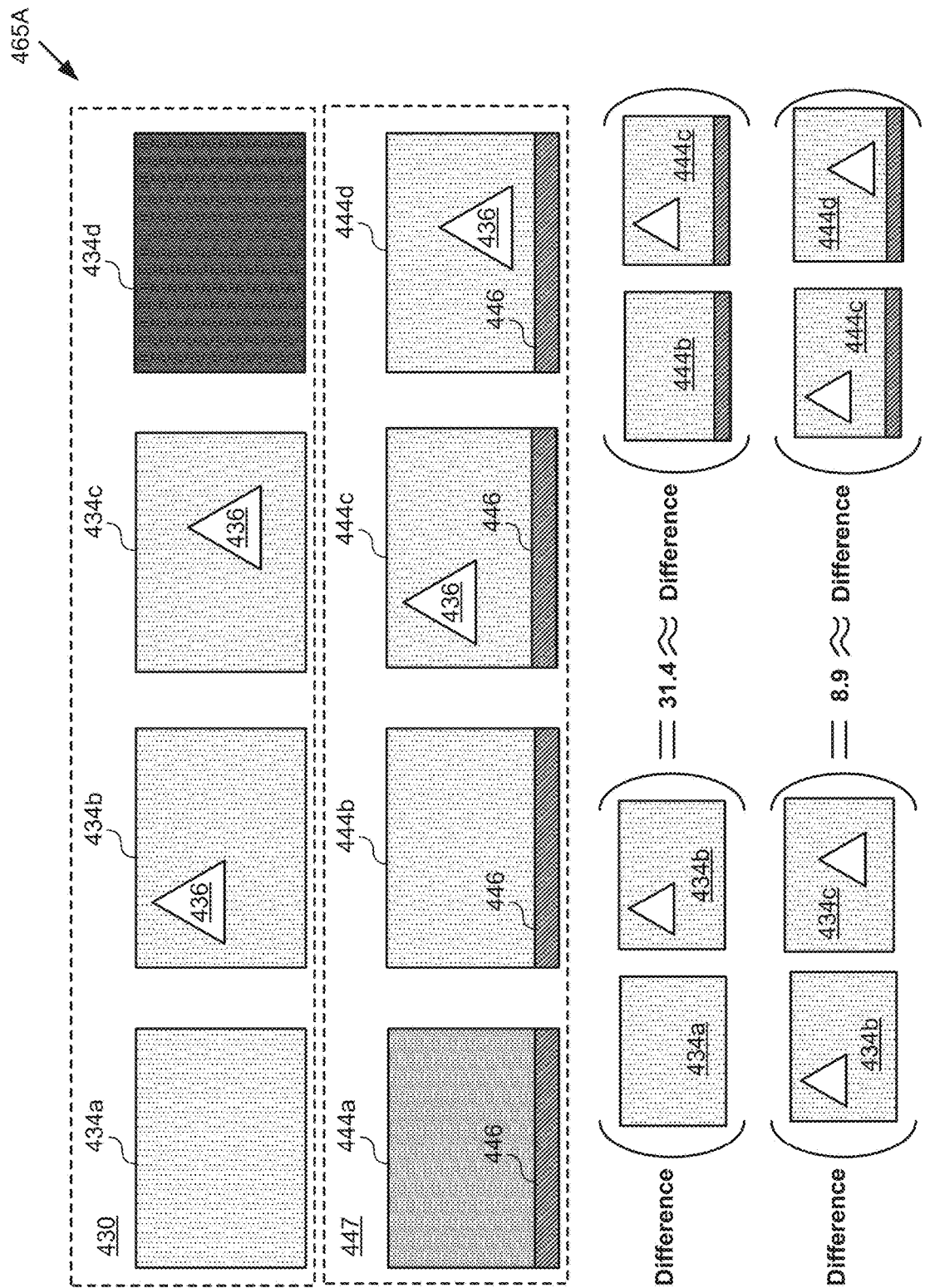

FAST VIDEO CONTENT MATCHING

This application is a Continuation of U.S. patent application Ser. No. 16/942,483, filed Jul. 29, 2020.

BACKGROUND

Due to the popularity of video as an entertainment medium, video distribution via television (TV) broadcasts and Internet video streams are also very effective channels for the distribution of advertising (ads). Some of those ads may be relatively insensitive to the passage of time due to their being directed to goods that are consistently available. For example, ads directed to clothing or over-the-counter medications may change seasonally but not daily or weekly, while ads directed to automobiles or cosmetics may remain substantially unchanged for many months. Other types of ads may be highly time sensitive, however, and may lose their value, or even become liabilities if their presentation to consumers is mistimed. Examples of such time sensitive ads are ads for upcoming events, such as a sporting events or movie releases, or for video content scheduled to air at a future date or at a later time.

Time sensitive ads for an upcoming event may be produced in multiple versions, and the order and timing with which those versions of the same core ad are presented to consumers may be very important. Mistakes with respect to that order or timing may undermine the success of an advertising campaign, and may even affect the reputation of the ad sponsor. For instance, an ad promoting an "upcoming event" that airs after the event may damage the credibility of the ad sponsor with consumers. Nevertheless, the policing of ad placement can be a time consuming and expensive process when performed manually, by a human editor. Even conventional automated techniques for searching video are typically too inefficient to provide an effective solution. Consequently, there is a need in the art for a fast video content matching solution enabling the identification of ads or other short video segments included in a longer video broadcast or stream.

SUMMARY

There are provided fast video content matching systems and methods, substantially as shown in and described in connection with at least one of the figures, and as set forth more completely in the claims.

BRIEF DESCRIPTION OF THE DRAWINGS

FIG. 3A shows a diagram depicting an exemplary reference digital profile of a reference video segment, according to one implementation;

FIG. 3B shows a diagram depicting an exemplary target digital profile of target video content, according to one implementation;

FIG. 3C shows an exemplary diagram depicting comparison of the reference digital profile of FIG. 3A with the target digital profile of FIG. 3B, according to one implementation;

FIG. 3D shows an exemplary diagram depicting detection, based on the comparison shown in FIG. 3C, of a candidate video segment of the target video content for matching to the reference video segment, according to one implementation;

FIG. 4A shows an exemplary diagram depicting an action performed during frame alignment of reference video frames of a reference video segment with corresponding candidate video frames of a candidate video segment to provide frame aligned video frame pairs, according to one implementation;

DETAILED DESCRIPTION

Figure 1:
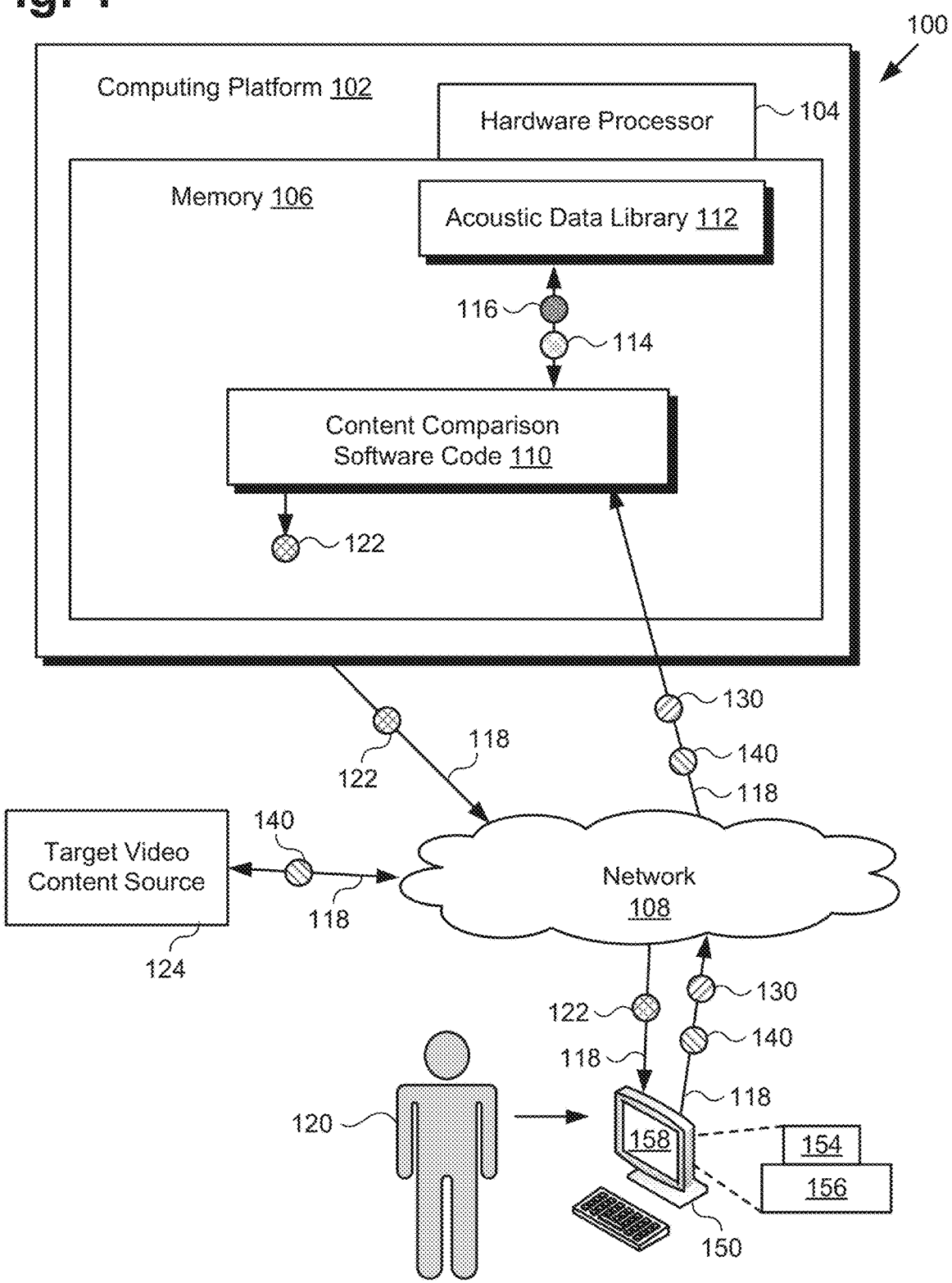
FIG. 1 shows a diagram of an exemplary system for performing fast video content matching, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses a video content matching solution that overcomes the drawbacks and deficiencies in the conventional art. In one exemplary implementation, a video content matching system obtains a reference digital profile of a reference video segment and a target digital profile of target video content that may or may not include the reference video segment. The reference and target digital profiles may be acoustic fingerprints or audio spectrographs of an audio component of the respective reference video segment and the target audio content. Once obtained, the reference and target digital profiles may be compared to enable detection, based on the comparison, of one or more candidate video segments of the target audio content for matching to the reference video segment. It is noted that comparison of the reference and target digital profiles results in a relatively coarse content filtering that enables fast detection of one or more candidate video segments within a much longer target video content.

For each detected candidate video segment of the target audio content, the video content matching system may frame align reference video frames of the reference video segment with corresponding candidate video frames of the candidate video segment, based on differences in frame-to-frame average pixel values for example, to provide frame aligned video frame pairs. The video content matching system may further pixel align each of the frame aligned video frame pairs to produce frame and pixel aligned video frame pairs, and may then advantageously identify, using the frame and pixel aligned video frame pairs, the candidate video segment as one of a matching video segment or a non-matching video segment for the reference video segment. Moreover, in some implementations the present solution further advantageously enables performance of the disclosed video content matching as an automated process.

It is noted that, as used in the present application, the terms "automation," "automated," and "automating" refer to systems and processes that do not require the participation of a human user, such as a human editor or supervisor. Although, in some implementations, a human editor or supervisor may confirm or reject an identification of a candidate video segment as a matching or non-matching video segment by the automated systems and according to the automated methods described herein, that human involvement is optional. Thus, the methods described in the present application may be performed under the control of hardware processing components of the disclosed systems.

FIG. 1 shows an exemplary system for performing fast video content matching, according to one implementation. As shown in FIG. 1, video content matching system 100 includes computing platform 102 having hardware processor 104 and memory 106 implemented as a non-transitory storage device. According to the present exemplary implementation, memory 106 stores content comparison software code 110 and may optionally store acoustic data library 112.

As further shown in FIG. 1, video content matching system 100 is implemented within a use environment including communication network 108, target video content source 124, user system 150 including display 158, and in some implementations, optional user system hardware processor 154 and user system memory 156. In addition, FIG. 1 shows user 120 utilizing user system 150. Also shown in FIG. 1 are network communication links 118 interactively connecting target video content source 124 and user system 150 with video content matching system 100 via communication network 108. FIG. 1 further shows reference video segment 130, reference digital profile 114 corresponding to reference video segment 130, target video content 140, target digital profile 116 corresponding to target video content 140, and match data 122 generated by content comparison software code 110.

Although the present application refers to content comparison software code 110 as being stored in memory 106 for conceptual clarity, more generally, memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102, or to user system hardware processor 154 of user system 150. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Moreover, although FIG. 1 depicts content comparison software code 110 as being stored in its entirety in memory 106, that representation is also provided merely as an aid to conceptual clarity. More generally, video content matching system 100 may include one or more computing platforms 102, such as computer servers for example, which may be co-located, or may form an interactively linked but distributed system, such as a cloud based system, for instance. As a result, hardware processor 104 and memory 106 may correspond to distributed processor and memory resources within video content matching system 100.

According to the implementation shown by FIG. 1, user 120 may utilize user system 150 to interact with video content matching system 100 over communication network 108. In one such implementation, video content matching system 100 may correspond to one or more web servers, accessible over a packet-switched network such as the Internet, for example. Alternatively, video content matching system 100 may correspond to one or more computer servers supporting a local area network (LAN), a wide area network (WAN), or included in another type of limited distribution or private network.

User 120 may utilize user system 150 to interact with video content matching system 100 to use content comparison software code 110, executed by hardware processor 104, to produce match data 122 based on a comparison of reference video segment 130 with target video content 140. It is noted that, in various implementations, match data 122, when generated using content comparison software code 110, may be stored in memory 106, may be copied to non-volatile storage, or may be stored in memory 106 and also be copied to non-volatile storage. Alternatively, or in addition, as shown in FIG. 1, in some implementations, match data 122 may be sent to user system 150 including display 158, for example by being transferred via network communication links 118 of communication network 108.

In some implementations, content comparison software code 110 may be utilized directly by user system 150. For example, content comparison software code 110 may be transferred to user system memory 156, via download over communication network 108, for example, or via transfer using a computer-readable non-transitory medium, such as an optical disc or FLASH drive. In those implementations, content comparison software code 110 may be persistently stored on user system memory 156, and may be executed locally on user system 150 by user system hardware processor 154.

Although user system 150 is shown as a desktop computer in FIG. 1, that representation is provided merely as an example. More generally, user system 150 may be any suitable mobile or stationary computing device or system that implements data processing capabilities sufficient to provide a user interface, support connections to communication network 108, and implement the functionality ascribed to user system 150 herein. For example, in some implementations, user system 150 may take the form of a laptop computer, tablet computer, or smartphone, for example. However, in other implementations user system 150 may be a "dumb terminal" peripheral component of video content matching system 100 that enables user 120 to provide inputs via a keyboard or other input device, as well as to view match data on display 158. In those implementations, user system 150 and display 158 may be controlled by hardware processor 104 of video content matching system 100. Alternatively, user 120 may utilize hardware processor 154 of user system 150 to execute content comparison software code 110 stored in user system memory 156, thereby generating match data 122 locally on user system 150.

With respect to display 158 of user system 150, display 158 may be physically integrated with user system 150 or may be communicatively coupled to but physically separate from user system 150. For example, where user system 150 is implemented as a smartphone, laptop computer, or tablet computer, display 158 will typically be integrated with user system 150. By contrast, where user system 150 is implemented as a desktop computer, display 158 may take the form of a monitor separate from user system 150 in the form of a computer tower. Moreover, display 158 may be implemented as a liquid crystal display (LCD), a light-emitting diode (LED) display, an organic light-emitting diode (OLED) display, or any other suitable display screen that performs a physical transformation of signals to light.

The functionality of content comparison software code 110 will be further described by reference to FIG. 2, which shows flowchart 260 presenting an exemplary method for performing fast video content matching, according to one implementation. With respect to the method outlined in FIG. 2, it is noted that certain details and features have been left out of flowchart 260 in order not to obscure the discussion of the inventive features in the present application.

Figure 2:
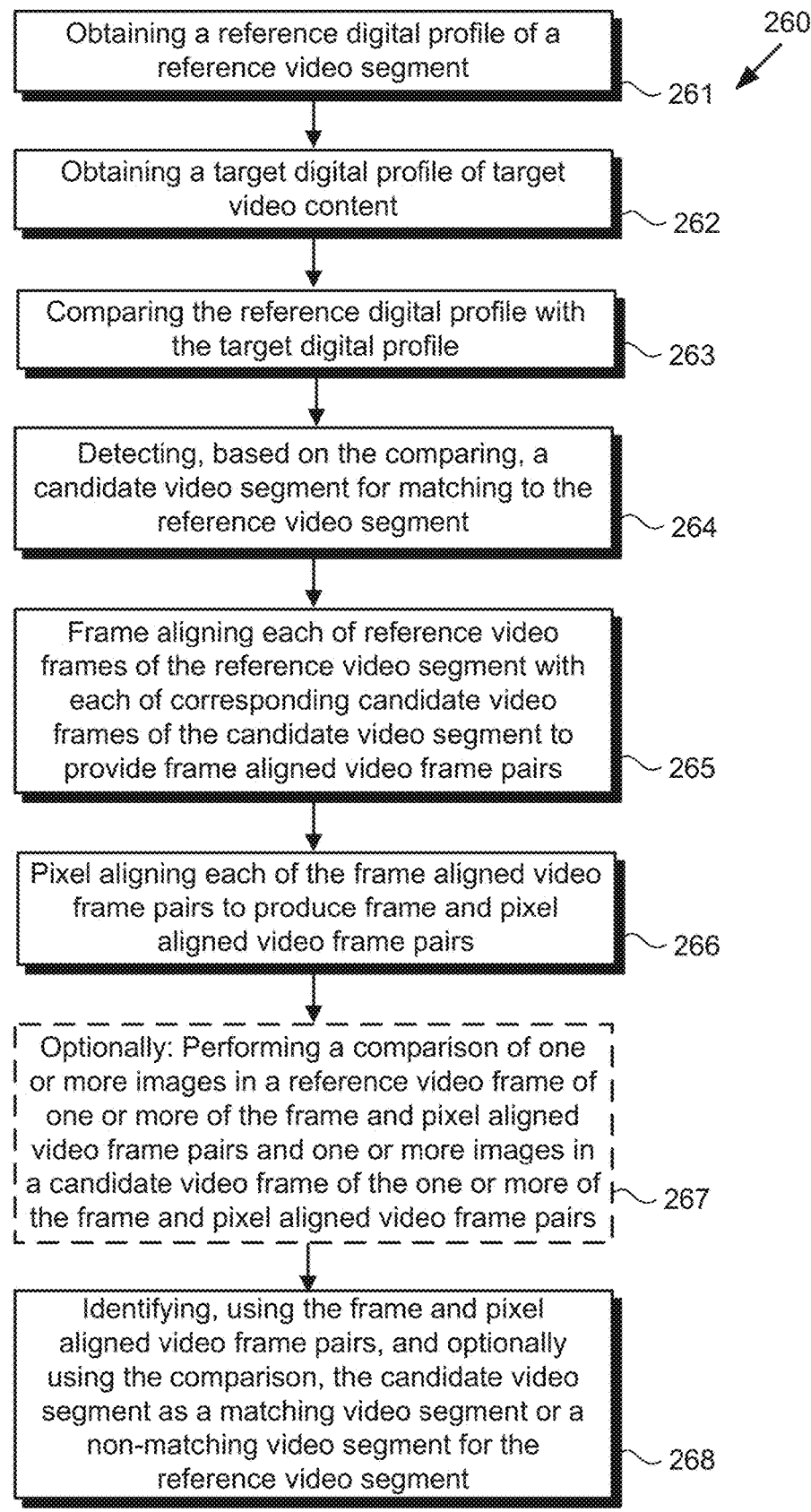
FIG. 2 shows a flowchart presenting an exemplary method for performing fast video content matching, according to one implementation.

Referring now to FIG. 2 in combination with FIG. 1, flowchart 260 begins with obtaining reference digital profile 114 of reference video segment 130 (action 261) and continues with obtaining target digital profile 116 of target video content 140 (action 262). Target video content 140 may include a video game, a movie, or a linear television (TV) program stream, for example. Target video content 140 may include a high-definition (HD) or ultra-HD (UHD) baseband video signal with embedded audio, captions, time code, and other ancillary metadata, such as ratings and parental guidelines. In some implementations, target video content 140 may be provided by target video content source 124, such as a TV broadcast network or other media distribution entity, utilizing secondary audio programming (SAP) or Descriptive Video Service (DVS), for example. Reference video segment 130 may take the form of advertising content intended or scheduled for inclusion in target video content 140.

Referring to FIGS. 3A and 3B in combination with FIGS. 1 and 2, FIG. 3A shows exemplary diagram 361 corresponding to action 261 and depicting reference digital profile 314 of reference video segment 130, while FIG. 3B shows exemplary diagram 362 corresponding to action 262 and depicting target digital profile 316 of target video content 140, according to one implementation. Also shown in FIGS. 3A and 3B are audio tracks 332 and 342 of respective reference video segment 130 and target video content 140, as well as time duration 326 of reference video segment 130 and time duration 328 of target video content 140.

It is noted that reference digital profile 314 and target digital profile 316, in FIGS. 3A and 3B, correspond respectively in general to reference digital profile 114 and target digital profile 116 in FIG. 1. Consequently, reference digital profile 114 and target digital profile 116 may share any of the characteristics attributed to respective reference digital profile 314 and target digital profile 316 by the present disclosure, and vice versa.

As noted above, reference video segment 130 may take the form of advertising content intended for inclusion in target video content 140. In addition, target video content 140 may be significantly longer than reference video segment 130. By way of example, reference video segment 130 may be advertising content having time duration 326 in a range from approximately five to sixty seconds, while target video content 140 may include advertising content and one or more of video game content, episodic TV programming content, movie content, news, or sports, and may have time duration 328 of thirty minutes or longer (e.g., sixty minutes or longer, ninety minutes or longer, etc.).

Moreover, the appearance of reference video segment 130 may be altered in target video content 140, while audio track 332 of reference video segment 130 may remain substantially unchanged. For example, the version of reference video segment 130 appearing in target video content 140 may include one or more graphics banner, which may include images, text, or a combination of images and text. Such a graphics banner or banners may be positioned at borders of reference video segment 130 as it appears in target video content 140 and may include sports or game scores, statistics, logos or other branding, as well as informative text and images. As a result, when comparing reference video segment 130 to video content included in target video content 140, it may be advantageous or desirable for reference digital profile 114/314 to be based on audio track 332 of reference video segment 130, and for target digital profile 116/316 to be based on audio track 342 of target video content 140.

According to some implementations, reference digital profile 114/314 and target digital profile 116/316 may be acoustic fingerprints of audio tracks 332 and 342 of respective reference video segment 130 and target video content 140. Alternatively, reference digital profile 114/314 and target digital profile 116/316 may be audio spectrographs or any other digitized representations of respective audio tracks 332 and 342.

In some implementations, user 120 may utilize user system 150 to interact with video content matching system 100 in order to discover whether reference video segment 130 is included in target video content 140. As shown by FIG. 1, in one implementation, user 120 may do so by transmitting one or both of reference video segment 130 and target video content 140 from user system 150 to video content matching system 100 via communication network 108 and network communication links 118. Alternatively, target video content 140 may be provided by a third party source, such as target video content source 124, or may be stored in memory 106.

As yet another alternative, and as noted above, in some implementations, content comparison software code 110 may be utilized directly by user system 150. In those implementations, one or both of reference video segment 130 and target video content 140 may be received from a third party source, or may be stored in user system memory 156. In some implementations, one or both of reference digital profile 114/314 and target digital profile 116/316 may be obtained from a database, such as acoustic data library 112. However, in other implementations, content comparison software code 110 may be configured to obtain one or both of reference digital profile 114/314 and target digital profile 116/316 by generating one or both of reference digital profile 114/314 and target digital profile 116/316 from respective audio tracks 332 and 342. Where reference digital profile 114/314 and target digital profile 116/316 are acoustic fingerprints, reference digital profile 114/314 and target digital profile 116/316 may be generated by content comparison software code 110 using an open source acoustic fingerprint extraction resource, such as Chromaprint, for example.

It is noted that although flowchart 260 shows action 261 as preceding action 262, in other implementations, action 262 may precede action 261. In yet other implementations, actions 261 and 262 may be performed in parallel, i.e., substantially concurrently. Reference digital profile 114/314 of reference video segment 130 and target digital profile 116/316 of target video content 140 may be obtained in actions 261 and 262 by content comparison software code 110, executed by hardware processor 104 of computing platform 102, or executed by user system hardware processor 154 of user system 150.

Flowchart 260 continues with comparing reference digital profile 114/314 of reference video segment 130 with target digital profile 116/316 of target video content 140 (action 263). Referring to FIG. 3C, FIG. 3C shows exemplary diagram 363 corresponding to action 263 and depicting comparison of the reference digital profile 114/314 of reference video segment 130 with target digital profile 116/316 of target video content 140, according to one implementation. As shown in FIG. 3C, action 263 may include shifting reference digital profile 114/314 over some or all of target digital profile 116/316 in search of a candidate match. The comparison of reference digital profile 114/314 of reference video segment 130 with target digital profile 116/316 of target video content 140 may be performed by content comparison software code 110, executed by hardware processor 104 of computing platform 102, or executed by user system hardware processor 154 of user system 150.

Flowchart 260 continues with detecting, based on the comparing performed in action 263, a candidate video segment of target video content 140 for matching to the reference digital profile 114/314 of reference video segment 130 (action 264). Referring to FIG. 3D. FIG. 3D shows exemplary diagram 364 corresponding to action 264 and depicting detection of a candidate video segment of target video content 140 corresponding to segment 317 of target digital profile 116/316, for matching to reference video segment 130. Graph 315 shows the correlation of reference digital profile 114/314 and target digital profile 116/316 as reference digital profile 114/314 is compared to different segments of target digital profile 116/316. As shown by graph 315, that correlation peaks when reference digital profile 114/314 is compared to segment 317 of target digital profile 116/316. The comparison of reference digital profile 114/314 of reference video segment 130 with target digital profile 116/316 of target video content 140 may be performed by content comparison software code 110, executed by hardware processor 104 of computing platform 102, or executed by user system hardware processor 154 of user system 150.

Flowchart 260 continues with frame aligning each of reference video frames of reference video segment 130 with each of corresponding candidate video frames of the candidate video segment detected in action 264 to provide frame aligned video frame pairs (action 265). Referring to FIG. 4A. FIG. 4A shows exemplary diagram 465A corresponding to action 265 and including reference video segment 430 having reference video frames 434a. 434b, 434c, and 434d, as well as candidate video segment 447 of target video content 140 that was detected in action 264. As shown in FIG. 4A, candidate video segment 447 includes candidate video frames 444a, 444b. 444c, and 444d (hereinafter "candidate video frames 444a-444d"). Also shown in FIG. 4A is graphics banner 446 appearing at the bottom border of each of candidate video frames 444a-444d, and object image 436 appearing in reference video frames 434b and 434c as well as in candidate video frames 444c and 444d.

Reference video segment 430 corresponds in general to reference video segment 130, in FIG. 1. Thus reference video segment 130 may share any of the characteristics attributed to corresponding reference video segment 430 by the present disclosure, and vice versa. Furthermore, it is noted that although graphics banner 446 is shown as being situated at the bottom border of each of candidate video frames 444a-444d, that representation is merely exemplary. In other implementations, one or more of candidate video frames 444a-444d may have a graphics banner situated at one or both side borders, or a top border, in addition to or in lieu of graphics banner 446 situated at a bottom border.

As shown in FIG. 4A, the digital profile based comparison and matching performed in action 263 and 264 result in detection of candidate video segment 447 that is a close match to reference video segment 130/430, but may not align at the frame level. In particular, due to the presence of graphics banner 446 in candidate video frames 444a-444d, pixel matching cannot be used to align the frames of reference video segment 130/430 with candidate video frames 444a-444d. Nevertheless, according to the present novel and inventive video content matching solution, differences in the average pixel values for sequential video frames of reference video segment 130/430 and candidate video segment 447 can be used to perform frame alignment.

For example, the difference in average pixel values between reference video frame 434b including object image 436 and previous reference video frame 434a from which object image 436 is omitted is greater than the difference in average pixel values between sequential reference video frames 434b and 434c that both include object image 436. Analogously, the difference in average pixel values between candidate video frame 444c including object image 436 and previous candidate video frame 444b from which object image 436 is omitted is greater than the difference in average pixel values between sequential candidate video frames 444c and 444d that both include object image 436.

It is noted that pixel values may be expressed as color values of individual pixels, or as pixel intensities, and differences in those pixel values for sequential video frames can be normalized and expressed as a number from zero to one hundred, for example, where zero corresponds to an exact match and increasingly large differences correspond to greater dissimilarity between sequential video frames. In the specific example shown in FIG. 4A, reference video frames 434a and 434b, as well candidate video frames 444b and 444c, which have substantially the same background but in which object image 436 included in reference video frame 434b and candidate video frame 444c is omitted from reference video frame 434a and candidate video frame 444b have exemplary normalized average pixel value differences equal to or approximately equal to 31.4. By contrast, reference video frames 434b and 434c, as well as candidate video frames 444c and 444d sharing similar backgrounds and object image 436 in common have a smaller exemplary normalized average pixel value difference of 8.9.

Figure 4B:
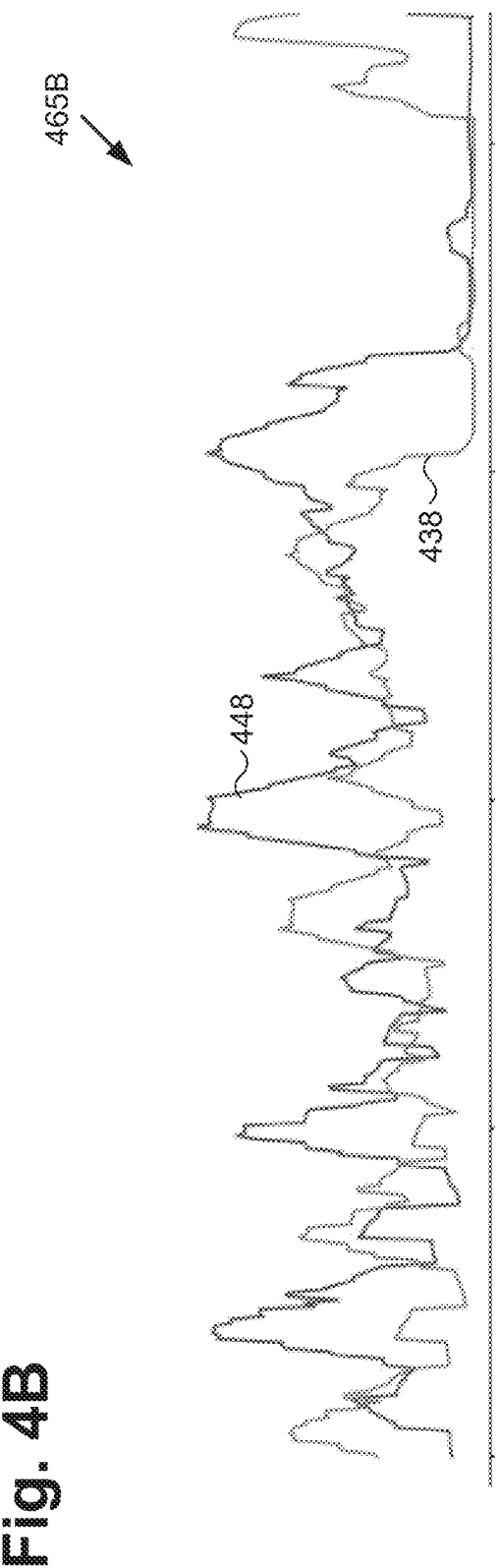
FIG. 4B shows an exemplary diagram depicting another action performed during frame alignment of reference video frames of a reference video segment with corresponding candidate video frames of a candidate video segment to provide frame aligned video frame pairs, according to one implementation.
Figure 4C:
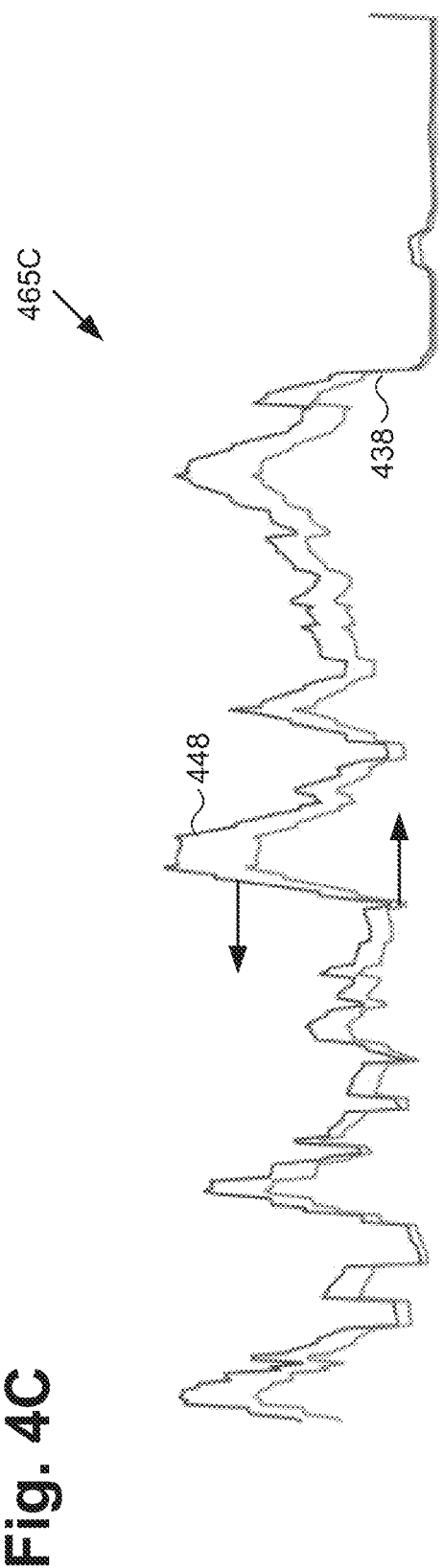
FIG. 4C shows an exemplary diagram depicting yet another action performed during frame alignment of reference video frames of a reference video segment with corresponding candidate video frames of a candidate video segment to provide frame aligned video frame pairs, according to one implementation.

Referring to FIG. 4B, FIG. 4B shows exemplary graph 465B corresponding to action 265 and including reference trace 438 tracking the frame-to-frame difference in average pixel values for reference video segment 130/430, and candidate trace 448 tracking the frame-to-frame difference in average pixel values for candidate video segment 447. As shown by FIG. 4B, when reference video segment 130/430 and candidate video segment 447 are not frame aligned, there may be significant divergence between reference trace 438 and candidate trace 448. However, as further shown by aligned graph 465C in FIG. 4C, shifting reference trace 438 or candidate trace 448 to substantially minimize their difference may serve to frame align reference video segment 130/430 and candidate video segment 447. For example, such a frame alignment process may provide a frame aligned video frame pair including reference video frame 434a and candidate video frame 444b, another frame aligned video frame pair including reference video frame 434b and candidate video frame 444c, and yet another frame aligned video frame pair including reference video frame 434c and candidate video frame 444d.

Thus, hardware processor 104 of computing platform 102, or user system hardware processor 154 of user system 150, may execute content comparison software code 110 to perform action 265 by computing candidate differentials based on an average of pixel differences between sequential candidate video frames of candidate video segment 447, and computing corresponding reference differentials based on an average of pixel differences between sequential reference video frames of reference video segment 130/430. Content comparison software code 110 may be further executed to frame align the reference video frames of reference video segment 130/430 and the candidate video frames of candidate video segment 447 so as to minimize the difference between the candidate differentials and the reference differentials for the frame aligned video frame pairs.

Figure 5A:
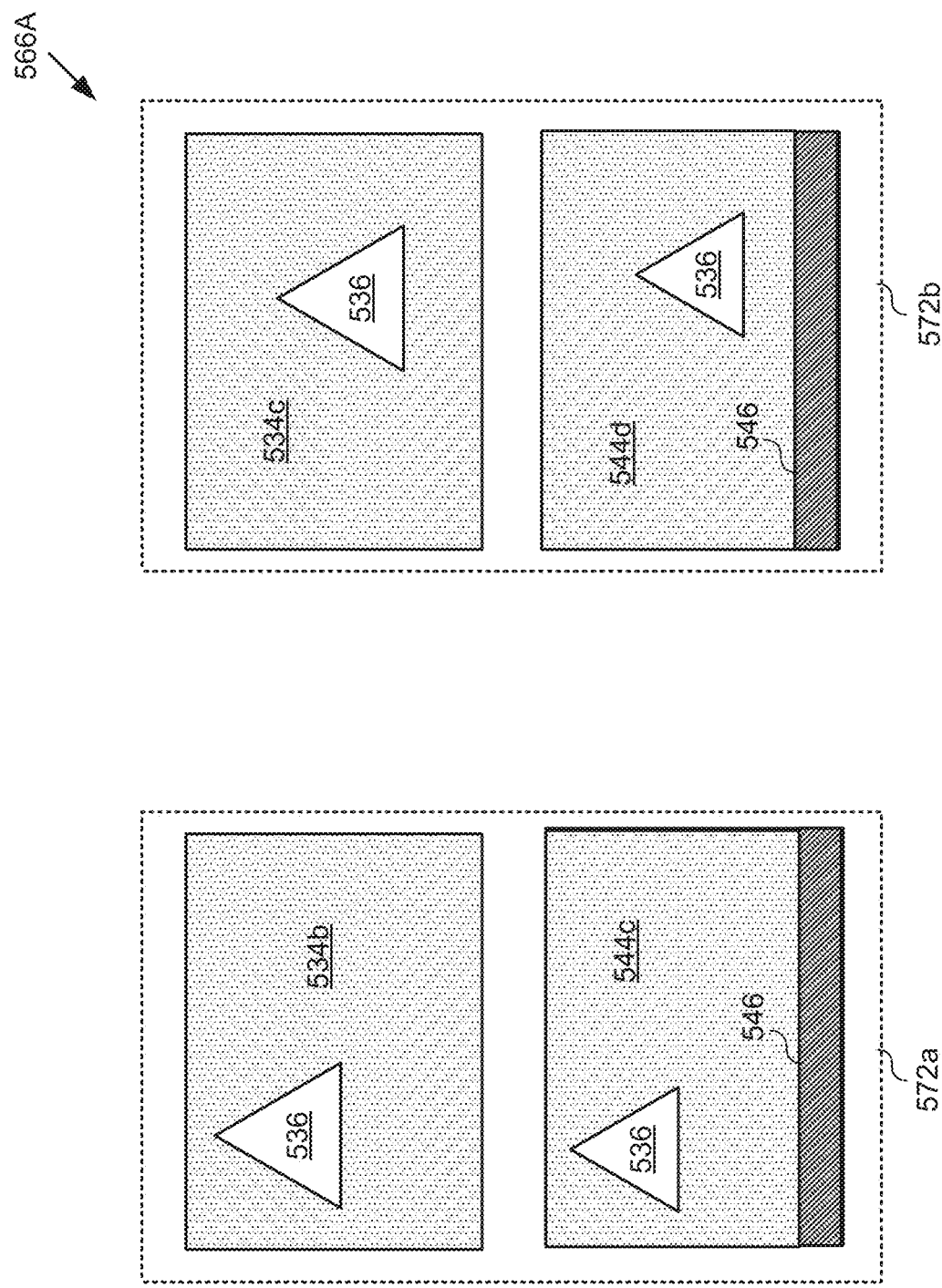
FIG. 5A shows an exemplary diagram depicting an action performed during pixel alignment of frame aligned video frame pairs to produce frame and pixel aligned video frame pairs, according to one implementation.

Flowchart 260 continues with pixel aligning each of the frame aligned video frame pairs provided in action 265 to produce frame and pixel aligned video frame pairs (action 266). Referring to FIG. 5A, FIG. 5A shows exemplary diagram 566A corresponding to action 266 and including frame aligned video frame pair 572a having reference video frame 534b and candidate video frame 544c, and frame aligned video frame pair 572b having reference video frame 534c and candidate video frame 544d. Also shown in FIG. 5A are object image 536 and graphics banner 546. Reference video frames 534b and 534c, candidate video frames 544c and 544d, object image 536, and graphics banner 546 correspond respectively in general to reference video frames 434b and 434c, candidate video frames 444c and 444d, object image 436, and graphics banner 446, in FIG. 4A. Consequently, reference video frames 434b and 434c, candidate video frames 444c and 444d, object image 436, and graphics banner 446 may share any of the characteristics attributed to respective reference video frames 534b and 534c, candidate video frames 544c and 544d, object image 536, and graphics banner 546 by the present disclosure, and vice versa.

Figure 5B:
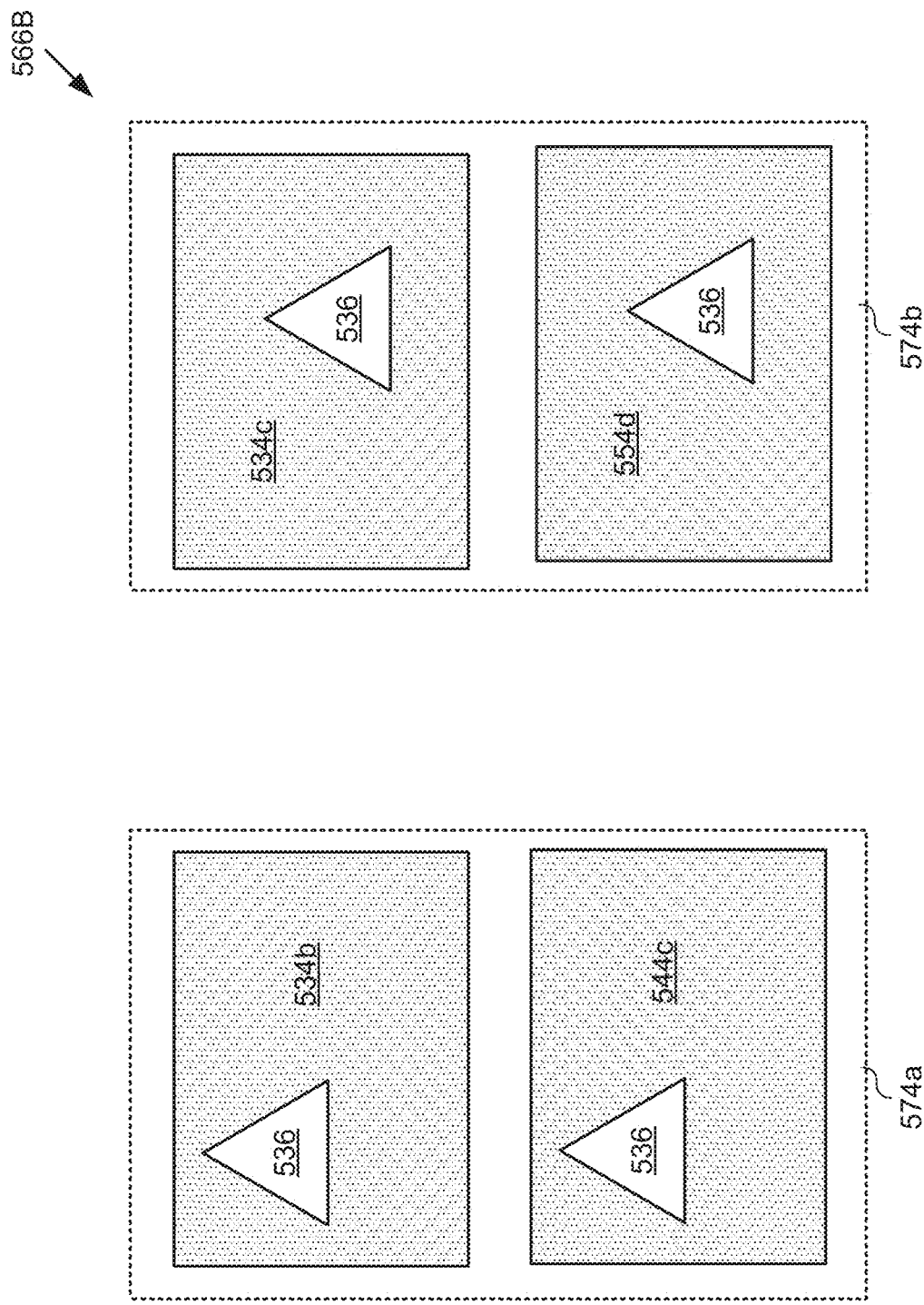
FIG. 5B shows an exemplary diagram depicting another action performed during pixel alignment of frame aligned video frame pairs to produce frame and pixel aligned video frame pairs, according to one implementation.

Referring to FIG. 5B, FIG. 5B shows diagram 566B of frame aligned video frame pairs 572a and 572b, in FIG. 5A, after the pixel aligning performed in action 266 is performed, resulting in frame and pixel aligned video frame pairs 574a and 574b. Action 266 may be performed by content comparison software code 110, executed by hardware processor 104 of computing platform 102, or by user system hardware processor 154 of user system 150, and using any suitable image processing technique. For example, in some implementations, content comparison software code 110 may be configured to perform pixel aligning in action 266 using an image registration technique, as known in the art. In some implementations, for instance, a point mapping technique may be utilized in which key points are extracted from each image of a frame aligned video frame pair, and RANSAC (random sample consensus) or another suitable algorithm is utilized to perform pixel aligning based on matching of the key points. Other image registration techniques include cross-correlation, the use of sequential similarity detection algorithms (SSDAs), and Fourier based registration methods, for example. As shown by FIG. 5B, the pixel aligning performed in action 266 may result in removal of graphics banner 446/546 from a border region of candidate video frames 544c and 544d.

Figure 6:
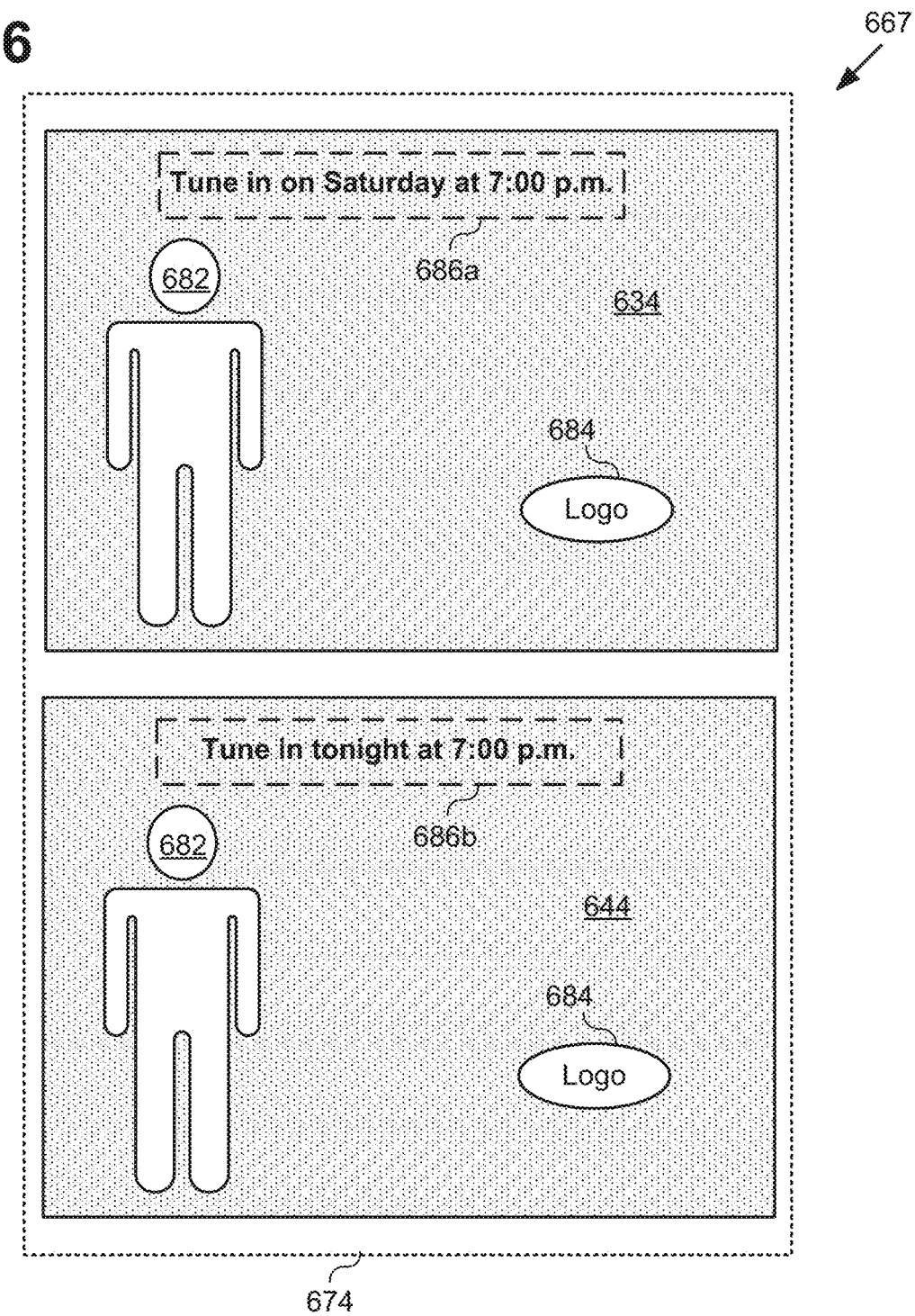
FIG. 6 shows an exemplary diagram depicting the optional comparison of one or more images included in a reference video frame with one or more images included in a candidate video frame of the same pixel and frame aligned video frame pair, according to one implementation.

In some implementations, the method outlined by flowchart 260 may optionally include performing a comparison of one or more images in a reference video frame of at least one of frame and pixel aligned video frame pairs 574a or 574b and one or more images in a candidate video frame of that same frame and pixel aligned video frame pair (action 267). Referring to FIG. 6, FIG. 6 shows diagram 667 corresponding to optional action 267 and depicting comparison of one or more images 682, 684, 686a included in reference video frame 634 of frame and pixel aligned video frame pair 674 with one or more images 682, 684, 686b included in candidate video frame 644 of frame and pixel aligned video frame pair 674.

Frame and pixel aligned video frame pair 674 corresponds in general to either or both of frame and pixel aligned video frame pairs 574a and 574b in FIG. 5B. That is to say, frame and pixel aligned video frame pairs 574a and 574b may share any of the characteristics attributed to frame and pixel aligned video frame pair 674 by the present disclosure, and vice versa. Reference video frame 634 corresponds in general to any or all of reference video frames 434a, 434b/534b, 434c/534c, and 434d, in FIGS. 4A, 5A, and 5B, while candidate video frame 644 corresponds in general to any or all of candidate video frames 444a. 444b, 444c/544c, and 444d/544d in those figures.

As shown in FIG. 6, images 682, 684, 686a, and 686b may depict a variety of different types of images. For example, and as also shown in FIG. 6, image 682 may be a face, image 684 may be logo or brand, and images 686a and 686b may be text. Comparison of one or more of images 682, 684, and 686a in reference video frame 634 of frame and pixel aligned video frame pair 674 with a corresponding one or more of images 682, 684, and 686b in candidate video frame 644 of frame and pixel aligned video frame pair 674 may be performed by content comparison software code 110, executed by hardware processor 104 of computing platform 102, or executed by user system hardware processor 154 of user system 150. By way of example, content comparison software code 110 may be configured to perform the comparison in action 267 using one or more of optical character recognition (OCR) on text 686a and 686b, logo recognition on logo or brand 684, and facial recognition on face 682.

In implementations in which optional action 267 is omitted from the method outlined by flowchart 260, flowchart 260 can continue directly from action 266 to action 268 and may conclude with identifying, using frame and pixel aligned video frame pairs 574a/574b/674 produced in action 266, candidate video segment 447 as one of a matching video segment or a non-matching video segment for reference video segment 130/430 (action 268). For example, as shown in FIGS. 4A and 5B, in one implementation, candidate video segment 447 may be identified as a matching video segment for reference video segment 430 due to matching of each of frame and pixel aligned video frame pairs 574a and 574b. It is noted that, in some use cases, minor differences may exist between video frames included in the same frame and pixel aligned video frame pair, due to frame rate or video coding differences, for example. Consequently, in some implementations, it may be advantageous or desirable to identify a candidate video segment as a matching video segment based on its meeting a similarity threshold requiring less than an exact match.

Alternatively, in implementations in which optional action 267 is included in the method outlined by flowchart 260, flowchart 260 can continue from action 267 and may conclude with identifying, using the comparison performed in action 267 as well as the frame and pixel aligned video frame pairs 574a/574b/674 produced in action 266, candidate video segment 447 as one of a matching video segment or a non-matching video segment for reference video segment 130/430. For example, as shown in FIGS. 4A, 5B, and 6, in one implementation, candidate video segment 447 may be identified as a non-matching video segment for reference video segment 130/430 despite matching of each of frame and pixel aligned video frame pairs 574a and 574b, and matching of face 682 and logo 684 in frame and pixel aligned video frame pair 674, due to the difference of text 686a in reference video frame 634 from corresponding text 686b in candidate video frame 644.

Action 268 results in generation of match data 122 identifying candidate video segment 447 as the matching or non-matching video segment for reference video segment 130/430. Action 268 may be performed by content comparison software code 110, executed by hardware processor 104 of computing platform 102, or executed by user system hardware processor 154 of user system 150.

In some implementations, match data 122 may be rendered on a display, such as display 158 of user system 150. In implementations in which user system 150 including display 158 is a dumb peripheral component of video content matching system 100, for example, the rendering of match data 122 on display 158 may be performed by content comparison software code 110, executed respectively by hardware processor 104 of computing platform 102. Alternatively, in implementations in which content comparison software code is executed locally on user system 150, the rendering of match data 122 on display 158 may be performed under the control of user system hardware processor 154.

It is noted that, in addition to one-to-one use cases in which a single target video sequence is searched for the presence of a reference video segment, the present novel and inventive approach may be used in many-to-one use cases as well, in which multiple target video sequences are searched for the presence of the same reference video segment. As a specific example of a many-to-one use case, a collection of one hundred target video sequences, for instance, may be searched substantially concurrently using a variation of the method outlined by flowchart 260. In some use cases, for example, actions 262, 263, and 264 may be performed for all one hundred target video sequences in order to identify a subset of target video sequences that include a candidate video segment for matching to the reference video segment.

The winnowing process described above may substantially reduce the number of target video sequences requiring further analysis using actions 265, 266, and 268, or actions 265, 266, 267, and 268. By way of example, a collection of one hundred target video sequences may be reduced to a subset of less than ten target video sequences as a result of actions 262, 263, and 264. Where the appropriate inclusion of advertising content within a broadcast video stream, as well as the timing or sequencing of that advertising content is important to an advertising campaign, the many-to-one use case may be particularly important. For instance the many-to-one approach may be used to track how often, when, and where within each broadcast video stream a particular advertisement is delivered, thereby enabling effective advertising analytics.

Thus, the present application discloses a video content matching solution that overcomes the drawbacks and deficiencies in the conventional art. As described above, in one exemplary implementation, a video content matching system obtains a reference digital profile of a reference video segment and a target digital profile of target video content that may or may not include the reference video segment. The reference and target digital profiles may be acoustic fingerprints or audio spectrographs of an audio component of the respective reference video segment and the target audio content. Once obtained, the reference and target digital profiles may be compared to enable detection, based on the comparison, of one or more candidate video segments of the target audio content for matching to the reference video segment. It is noted that comparison of the reference and target digital profiles results in a relatively coarse content filtering that enables fast detection of one or more candidate video segments within a much longer target video content.

For each detected candidate video segment of the target audio content, the video content matching system may frame align reference video frames of the reference video segment with corresponding candidate video frames of the candidate video segment, based on differences in frame-to-frame average pixel values for example, to provide frame aligned video frame pairs. The video content matching system may further pixel align each of the frame aligned video frame pairs to produce frame and pixel aligned video frame pairs, and may then advantageously identify, using the frame and pixel aligned video frame pairs, and optionally comparison of images included in the reference video frame and candidate video frame of each frame and pixel aligned video frame pair, the candidate video segment as one of a matching video segment or a non-matching video segment for the reference video segment.

It is noted that, due to the early detection of relatively short duration candidate video segments. i.e., segments lasting from approximately five to approximately sixty seconds, within significantly longer duration target video content lasting up to half an hour or more, the present solution is advantageously able to perform fast matching of video content. By way of example, although the time required to perform video matching varies based on the number of candidate video segments detected, on average, one hour of target video content can be searched and matched based on the present novel and inventive concepts in from approximately one minute to approximately 5 minutes, with average search and match times being approximately two minutes and thirty seconds for one hour of target video content.

It is further noted that, in some implementations, hardware processor 104 of computing platform 102, or user system hardware processor 154 of user system 150, may execute content comparison software code 110 to perform actions 261, 262, 263, 265, 266 (hereinafter "action 261-266"), and 268, or actions 261-266, 267, and 268, in an automated process from which human involvement may be omitted.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A video content matching system comprising:
a computing platform including a hardware processor and a memory storing a software code;
the hardware processor configured to execute the software code to:
 obtain a reference video segment and a reference audio component of the reference video segment;
 obtain a target video content and a target audio component of the target video content;
 compare the reference audio component of the reference video segment with the target audio component of the target video content;
 detect, based on comparing, a candidate video segment of the target video content for matching to the reference video segment;
 frame align each of reference video frames of the reference video segment with each of corresponding candidate video frames of the candidate video segment of the target video content to provide a plurality of frame aligned video frame pairs; and
 identify, using the plurality of frame aligned video frame pairs, the candidate video segment as one of a matching video segment or a non-matching video segment for the reference video segment.

2. The video content matching system of claim 1, wherein the hardware processor is further configured to execute the software code to:
 perform a comparison of one or more images in a first reference video frame of at least one of the plurality of frame aligned video frame pairs and one or more images in a first candidate video frame of the at least one of the plurality of frame aligned video frame pairs;
 wherein the identifying further uses the comparison to identify the candidate video segment as the one of the matching video segment or the non-matching video segment for the reference video segment.

3. The video content matching system of claim 2, wherein the one or more images in the first reference video frame and the first candidate video frame comprise at least one of text, a logo, or a face.

4. The video content matching system of claim 3, wherein the hardware processor is further configured to execute the software code to perform the comparison using at least one of optical character recognition (OCR) on the text, logo recognition on the logo, or facial recognition on the face.

5. The video content matching system of claim 1, wherein the hardware processor is further configured to execute the software code to perform the frame aligning by:
 computing a plurality of candidate differentials based on an average of pixel differences between sequential candidate video frames of the candidate video segment;
 computing a corresponding plurality of reference differentials based on an average of pixel differences between sequential reference video frames of the reference video segment; and
 frame aligning the reference video frames of the reference video segment and the candidate video frames of the candidate video segment so as to minimize a difference between the plurality of candidate differentials and the plurality of reference differentials for the plurality of frame aligned video frame pairs.

6. The video content matching system of claim 1, wherein the target video content is longer than the reference video segment.

7. The video content matching system of claim 1, wherein the reference audio component is included in a reference digital profile.

8. The video content matching system of claim 1, wherein the reference audio component includes an acoustic fingerprint or an audio spectrograph.

9. The video content matching system of claim 1, wherein the target audio component is included in a target digital profile.

10. The video content matching system of claim 1, wherein the target audio component includes an acoustic fingerprint or an audio spectrograph.

11. A method for use by a video content matching system including a computing platform having a hardware processor and a memory storing a software code, the method comprising:
 obtaining, by the software code executed by the hardware processor, a reference video segment and a reference audio component of the reference video segment;
 obtaining, by the software code executed by the hardware processor, a target video content and a target audio component of the target video content;
 comparing, by the software code executed by the hardware processor, the reference audio component of the reference video segment with the target audio component of the target video content;
 detecting, by the software code executed by the hardware processor, based on comparing, a candidate video segment of the target video content for matching to the reference video segment;
 frame aligning, by the software code executed by the hardware processor, each of reference video frames of the reference video segment with each of corresponding candidate video frames of the candidate video segment of the target video content to provide a plurality of frame aligned video frame pairs; and
 identifying, by the software code executed by the hardware processor, using the plurality of frame aligned video frame pairs, the candidate video segment as one of a matching video segment or a non-matching video segment for the reference video segment.

12. The method of claim 11, further comprising:
 performing a comparison, by the software code executed by the hardware processor, of one or more images in a first reference video frame of at least one of the plurality of frame aligned video frame pairs and one or more images in a first candidate video frame of the at least one of the plurality of frame aligned video frame pairs;
 wherein the identifying further uses the comparison to identify the candidate video segment as one of the matching video segment or the non-matching video segment for the reference video segment.

13. The method of claim 12, wherein the one or more images in the first reference video frame and the first candidate video frame comprise at least one of text, a logo, or a face.

14. The method of claim 13, wherein performing the comparison includes using at least one of optical character recognition (OCR) on the text, logo recognition on the logo, or facial recognition on the face.

15. The method of claim 11, wherein the frame aligning is performed by:
- computing, by the software code executed by the hardware processor, a plurality of candidate differentials based on an average of pixel differences between sequential candidate video frames of the candidate video segment;
- computing, by the software code executed by the hardware processor, a corresponding plurality of reference differentials based on an average of pixel differences between sequential reference video frames of the reference video segment; and
- frame aligning, by the software code executed by the hardware processor, the reference video frames of the reference video segment and the candidate video frames of the candidate video segment so as to minimize a difference between the plurality of candidate differentials and the plurality of reference differentials for the plurality of frame aligned video frame pairs.

16. The method of claim 11, wherein the target video content is longer than the reference video segment.

17. The method of claim 11, wherein the reference audio component is included in a reference digital profile.

18. The method of claim 11, wherein the reference audio component includes an acoustic fingerprint or an audio spectrograph.

19. The method of claim 11, wherein the target audio component is included in a target digital profile.

20. The method of claim 11, wherein the target audio component includes an acoustic fingerprint or an audio spectrograph.

* * * * *